(12) United States Patent
Jochumsen

(10) Patent No.: US 10,350,948 B2
(45) Date of Patent: Jul. 16, 2019

(54) FILLING DEVICE FOR AN INFLATABLE UNIT

(71) Applicant: Easyfill ApS, Toreby L (DK)

(72) Inventor: Hans Henrik Jochumsen, Allerød (DK)

(73) Assignee: EasyfillAps, Toreby L (DK)

( * ) Notice: Subject to any disclaimer, the term of this patent is extended or adjusted under 35 U.S.C. 154(b) by 169 days.

(21) Appl. No.: 15/321,082

(22) PCT Filed: Jun. 23, 2015

(86) PCT No.: PCT/EP2015/064086
§ 371 (c)(1),
(2) Date: Dec. 21, 2016

(87) PCT Pub. No.: WO2015/197603
PCT Pub. Date: Dec. 30, 2015

(65) Prior Publication Data
US 2017/0144494 A1    May 25, 2017

(30) Foreign Application Priority Data

Jun. 23, 2014 (EP) .................................. 14173443

(51) Int. Cl.
*F16K 15/20* (2006.01)
*B60C 23/04* (2006.01)
*B60C 29/06* (2006.01)
*B60C 29/00* (2006.01)
*B60C 19/00* (2006.01)

(52) U.S. Cl.
CPC ........ *B60C 23/0403* (2013.01); *B60C 29/005* (2013.01); *B60C 29/068* (2013.01); *F16K 15/207* (2013.01); *B60C 2019/006* (2013.01); *Y10T 137/3646* (2015.04)

(58) Field of Classification Search
CPC ............... B60C 23/0403; F16K 15/207; Y10T 137/3646; Y10T 137/36
See application file for complete search history.

(56) References Cited

U.S. PATENT DOCUMENTS

| | | | | |
|---|---|---|---|---|
| 1,354,355 A | * | 9/1920 | Tryon | B60C 23/0403 116/34 R |
| 1,368,400 A | * | 2/1921 | Kelley | B60C 23/0403 116/34 R |
| 1,769,508 A | * | 7/1930 | Harned | B60C 23/0403 116/34 R |
| 2,004,822 A | * | 6/1935 | Mercier | B60C 23/0403 137/224 |
| 2,069,128 A | * | 1/1937 | Blantz | B60C 23/0403 116/34 R |

(Continued)

FOREIGN PATENT DOCUMENTS

WO    WO2007134611    11/2007

*Primary Examiner* — Robert K Arundale
(74) *Attorney, Agent, or Firm* — McHale & Slavin, P.A.

(57) ABSTRACT

The invention provides a filling device for an inflatable unit, e.g., a pneumatic tire for a car. The device is connectable to a source of air pressure and to a valve for the inflatable unit. The valve has a whistle arranged to produce an audible signal based on a flow of air in the release outlet, and to enable improved handling and sound performance, the whistle comprises a flow-path forming a first leg extending radially from the passage, and a second leg extending about the passage.

20 Claims, 12 Drawing Sheets

(56) References Cited

U.S. PATENT DOCUMENTS

| | | | | |
|---|---|---|---|---|
| 2,166,384 | A | * | 7/1939 | West .................. B60C 23/0403 116/34 R |
| 2,967,508 | A | | 1/1961 | Hovorka |
| 3,738,308 | A | * | 6/1973 | Barabino ............ B60C 23/0403 116/34 R |
| 3,807,432 | A | * | 4/1974 | Cain .................... F16K 15/207 137/224 |
| 3,830,249 | A | | 8/1974 | Fleenor et al. |
| 4,103,282 | A | * | 7/1978 | Cook ................. B60C 23/0403 116/34 R |
| 4,660,590 | A | | 4/1987 | Sanchez |
| 5,365,967 | A | | 11/1994 | Moore |
| 6,125,694 | A | * | 10/2000 | Bledsoe ............... B60C 23/001 73/146.8 |
| 6,302,138 | B1 | * | 10/2001 | Sumrall ............. B60C 23/0496 137/226 |
| 6,948,516 | B1 | * | 9/2005 | Williams ................ B60C 29/06 137/224 |
| 2007/0169818 | A1 | * | 7/2007 | Badstue ................. B60C 29/06 137/225 |
| 2008/0078450 | A1 | * | 4/2008 | Milanovich ........... F16K 15/207 137/230 |
| 2009/0308462 | A1 | * | 12/2009 | Badstue ................. B60C 29/06 137/230 |

* cited by examiner

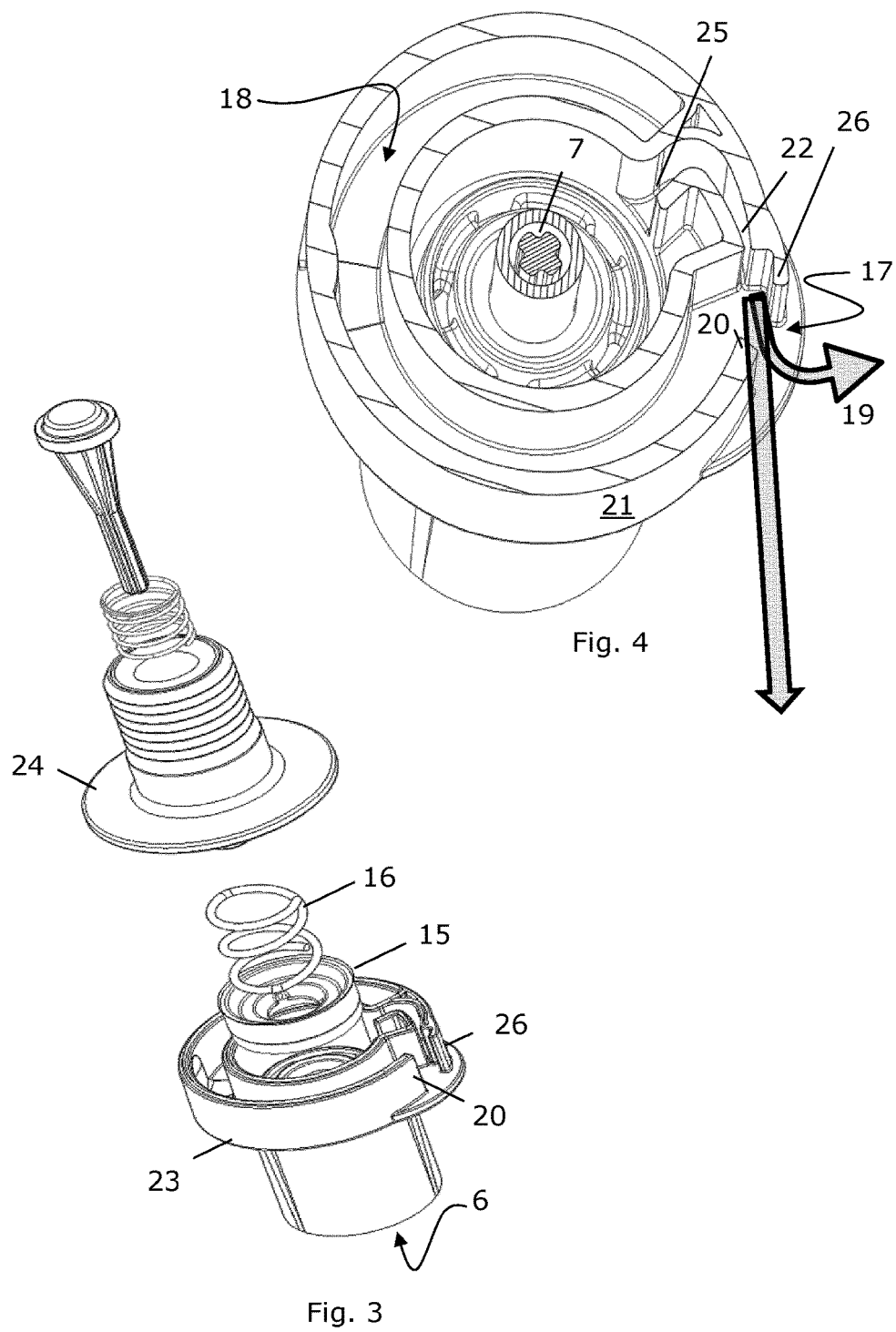

FILLING DEVICE FOR AN INFLATABLE UNIT

CROSS REFERENCE TO RELATED APPLICATIONS

This is a national stage filing in accordance with 35 U.S.C. § 371 of PCT/EP2015/064086, filed Jun. 23, 2015, which claims the benefit of the priority of European Patent Application No. 14173443.4, filed Jun. 23, 2014, the contents of each are incorporated herein by reference.

TECHNICAL FIELD

The present invention relates to a filling device for an inflatable unit, in particular a pneumatic tire for a vehicle. The device is intended to facilitate inflation of the tire by connection to a pump or compressor, and it may be provided as a spare unit which is mountable to a valve or integrated in the tire, or it may itself be integrated in the tire. The valve device may incorporate a pressure relief mechanism which will release air from the tire when the pressure in the tire exceeds a certain threshold value and/or which prevents excess air from being forced into the tire during inflation thereof.

BACKGROUND OF THE INVENTION

Various pressure relief devices for inflatable tires have been proposed in the prior art. U.S. Pat. No. 3,830,249 discloses a device in which a pressure relief ball is maintained in a seated position by a force applied by a compression spring until the air pressure within the tire exceeds a set pressure. When the set pressure has been exceeded, the pressure relief ball is unseated from the body, and surplus air escapes from the tire via the pressure relief device.

U.S. Pat. No. 4,660,590 is concerned with an inflation pressure regulator. A sealing section of a flexure member is urged into sealing contact with a seat. When the tire has been inflated to the pressure rating of the regulator, the pressure in a first chamber will exert sufficient force to cause flexing in a portion thereof and a consequential movement of the sealing section away from the seat surface, allowing air to escape via an exhaust aperture.

WO 2007/134611 discloses a pressure relief device for an inflatable tire comprising a body having a pressure relief mechanism and a conduit being provided as a passage in a pin for releasing a stem of a tire.

U.S. Pat. No. 5,365,967 discloses a tire pressure indicator which includes a valve stem over-pressure indicator and a valve stem cap under-pressure indicator. When the over-pressure condition is reached within a tire, air flows through lateral ports of the valve stem to escape around a regulator O-ring into a chamber, and air from the chamber escapes through ports adjacent reeds to make a whistling sound so long as over-pressure conditions endures.

Pressure relief devices capable of providing audible signals in response to the filling or adjustment of the pressure in the tire exist. One generally recognised problem with such audible signals is that they cause frustration for the user and for others when the filling process becomes noisy.

DESCRIPTION OF THE INVENTION

It is an object of embodiments of the invention to enable improved handling and sound performance of a filling device, and to provide a device which allows filling, e.g. of pneumatic tires, to a precise pressure. It is a further object to provide a new way of filling a tire and other inflatable objects, it is another object to provide a low cost, low weight, and small size filling device with audible capabilities. It is another object to increase stability and reduce the risk of faults, e.g. caused by dust and wear.

According to the above and other objects, and in a first aspect, the present invention provides a filling device for an inflatable unit.

The device according to the first aspect comprises a body having an inlet connectable to a source of pressure and an outlet connectable to a valve for the inflatable unit; a passage extending axially between the inlet and outlet; an air-release path from the passage to an external space; a valve arranged between the passage and the air-release path and being configured to open at a predefined pressure; and a whistle arranged to produce an audible signal based on a flow of air in the release outlet.

According to the invention the whistle is configured not to provide the audible signal when the flow of air in the air-release path exceeds an upper flow limit.

By having configured the whistle only to provide the audible signal when the flow of air is below the upper flow limit, the device may only provide the audible signal at a certain band of air pressure, given that filling is not taking place.

By having configured the whistle only to provide the audible signal when the flow of air is below the upper flow limit, the generation of sound can be avoided during the filing where the flow is typically above the upper flow limit, compared to the prior art where a sound is provided as long as over-pressure conditions endures.

This has at least the following advantages: The user avoids listening to an annoying sound during the entire filling process, and the user may be much more alert when the whistling sound occurs.

During filling of a partly flat tire, taken as an example, or when having overfilled a tire, the entrance and exit of large amounts of air can create an airflow above the upper flow limit, and the audible signal stops. When the pressure reduces, the flow of air becomes below the upper flow limit and the whistle thereby enters the range in which the audible signal is transmitted.

Accordingly, the invention may provide the effect that the whistling occurs only when the pressure in the inflatable unit and thus the airflow into and out of the unit is close to, or exactly correct.

It should be understood, that the filling device may be particularly suited for cooperation with an American valve, also called a Schrader valve. Schrader valves are used on automobile tires, bicycle tires, in air conditioning systems, plumbing, fuel injection engines, suspension systems, SCUBA regulators, and in many other inflatable items.

The Schrader valve allows removal and attachment of the inflation hose while in use. When the inflatable item is being inflated, the stem is depressed and the air passage is opened. Otherwise, the stem is pressed upwards and seals the passage. Accordingly, the filling device of the present invention will not release air from the tire unless the air passage is actively opened during inflation by actuation of the stem.

The device has an air-release path that releases air when the pressure in the inflatable unit exceeds a certain level and gives a clear audible signal when the tire pressure is within a band, particularly a narrow band, particularly within a band of less than 1 bar band width or even less than 1/10 bar band width of a predetermined pressure value.

This enables a new filling sequence according to which a user may fill the tire periodically, and stop the filling periodically to listen for a high whistling sound which indicates that the correct pressure is achieved. The user may e.g. fill for 4 seconds, pause for 2 seconds to listen, and repeat this procedure until the high whistling sound is transmitted. As a result, the adjustment of the car tire pressure may be silent until the right pressure is about to be achieved or until it is achieved, and since the audible signal is only transmitted when the flow is below the upper flow limit, the filling of the inflatable unit may become very precise.

In one embodiment, the whistle forms a tone-chamber. The filling device may comprise a flow diverting structure which is arranged between the release outlet and the tone-chamber. The flow diverting structure may be configured to change the direction of the flow of air after it has been released at the release outlet, and the flow diverting structure may be configured to establish the change of the direction when reaching the upper flow limit.

Particularly, the flow diverting structure may change the pressure conditions in or around the flow such that the flow direction changes. For this purpose, the flow diverting structure may cause a lower pressure locally in one side of the flow such that the flow bends.

The configuration of the whistle not to provide the audible signal when the flow of air in the air-release path exceeds an upper flow limit may be provided by an asymmetric airflow at the release outlet. Particularly, the flow diverting structure may have a shape which creates the asymmetric airflow when the flow speed is above the upper flow limit.

The Coanda effect may be used to create the asymmetry, e.g. created by the flow diverting structure which may be formed as an asymmetric wall section at the release outlet. The Coanda-effect results from entrainment of ambient fluid around a fluid jet. It can be created by a convex surface along which the air in the whistle streams. It may be an advantage, if the flow diverting structure is configured so that the Coanda effect occurs before the flow of air changes from a laminar flow to a turbulent flow, as a turbulent flow may result in unpleasant noise instead of a whistling sound as creased by the laminar flow. Accordingly, the flow diverting structure may be configured to initiate the change in flow direction prior at a flow speed where turbulent flow is not yet created.

Thus, the flow diverting structure may cause a change of the direction of the flow of air after it has been released at the release outlet. It should however be understood, that the release outlet itself may form the flow diverting structure, e.g. by the shape of release outlet being narrowed down.

The mentioned shape causing the Coanda effect may include a convex wall element, particularly at or near the release outlet, e.g. directly adjacent the release outlet.

By flow limit is herein meant a specific amount of air e.g. measured in liters per second.

As mentioned above, the flow diverting structure may form an asymmetric wall section at the release outlet. It should however be understood, that the flow diverting structure alternatively may be formed as a symmetric element, whereby the Coanda effect may also be caused by a symmetric flow diverting structure.

In one embodiment, the flow diverting structure forms a resilient wall section. In the context of the present invention, the term "resilient wall section" should be understood as a wall section made of a material which makes the wall section more soft/movable than other elements of the filling device in the area of the resilient wall section whereby the shape of the resilient wall section can be changed by the flow of air. As an example, the resilient wall section may be formed as lip section.

As an alternative to the flow diverting structure or in addition to the flow diverting structure, the filling device may comprise a flow disturbing structure e.g. in the form of a bleed opening in the passage in the vicinity of the release outlet. The flow disturbing structure may cause a change of the flow of air from a laminar flow to a turbulent flow after it has been released at the release outlet, whereby the whistle does not to provide the audible signal when the flow of air in the air-release path exceeds the upper flow limit. Before flow of air in the air-release path exceeds the upper flow limit, the whistle will create an unpleasant sound in the form of a hiss sound, however, still stopping the whistle during to the lack of laminar flow at the release outlet.

In one embodiment, the whistle is configured not to provide the audible signal when the flow of air in the air-release path is below a lower flow limit. This is enabled by choosing appropriate speeds of air and regimes of laminar and turbulent flow.

In this embodiment, an active range is defined between the lower flow limit and the upper flow limit. Outside this active range, the whistle may become more silent than inside the range.

The air-release path may have a cross-sectional area which reduces in the flow direction of air being released into the external space through the air-release path. This increases the flow speed towards the release outlet and enables a more precise definition of the upper and lower flow limits.

In one embodiment, the air-release path forms a circumferential section extending about the passage extending axially between the inlet and outlet. This may provide a device with a relatively small size in the axial direction and a larger radial dimension transverse to the axial direction. This may improve the handling of the device. Particularly, it may enable a device having essentially the same size, shape, and weight as a regular valve cap for a tire valve.

The air-release path may form an initial section extending radially away from the passage, and the above mentioned circumferential section coextending the initial section in the flow direction.

The circumferential section could be between the initial section and the release outlet in the flow direction of air being released into the external space through the air-release path.

Due to the circumferential section of the flow path, the whistle can obtain a relatively long flow-path without, or essentially without, increasing the size of the filling device. The flow path which extends about the passage may increase a crosswise dimension perpendicular to the axial direction of the passage, i.e. typically the diameter. This may be an advantage since it allows a better grip and thereby increases the handling of the device and the filling of the inflatable unit.

The inflatable unit may particularly be a pneumatic tire, e.g. for a car or a truck or a bus. The tire may have to be filled to a precise pressure in the range of 1-11 bars, such as in the range of 1-4 bars or 7-11 bars, dependent on the type of tire. The tires may be filled by use of pumps providing a pressure typically in the range of 5-15 bars.

The whistle may form a tone chamber extending about the passage. Particularly, the tone chamber may form an extension of the circumferential section and the release outlet could be between the air-release path and the tone chamber.

In a second aspect, the invention provides a method of filling an inflatable unit by use of a filling device capable of releasing air to an external space at a predetermined air pressure and to produce an audible signal as a consequence of the release of air. The method according to the second aspect comprises the steps of repeating:

filing air into the inflatable unit via the filling device; and
stopping the filling while listening for the audible signal;
until the audible signal begins when the filling is stopped.

The method may further comprise a step of attaching the filling device to a Schrader valve before the step of filling air into the inflatable unit.

The method may be carried out by use of a filling device according to the first aspect of the invention.

BRIEF DESCRIPTION OF THE DRAWINGS

FIG. 3 illustrates an exploded view of the filling device;
FIG. 4 illustrates a filling device in an open configuration and seen from below.

DETAILED DESCRIPTION OF AN EMBODIMENT

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figures 1, 2:
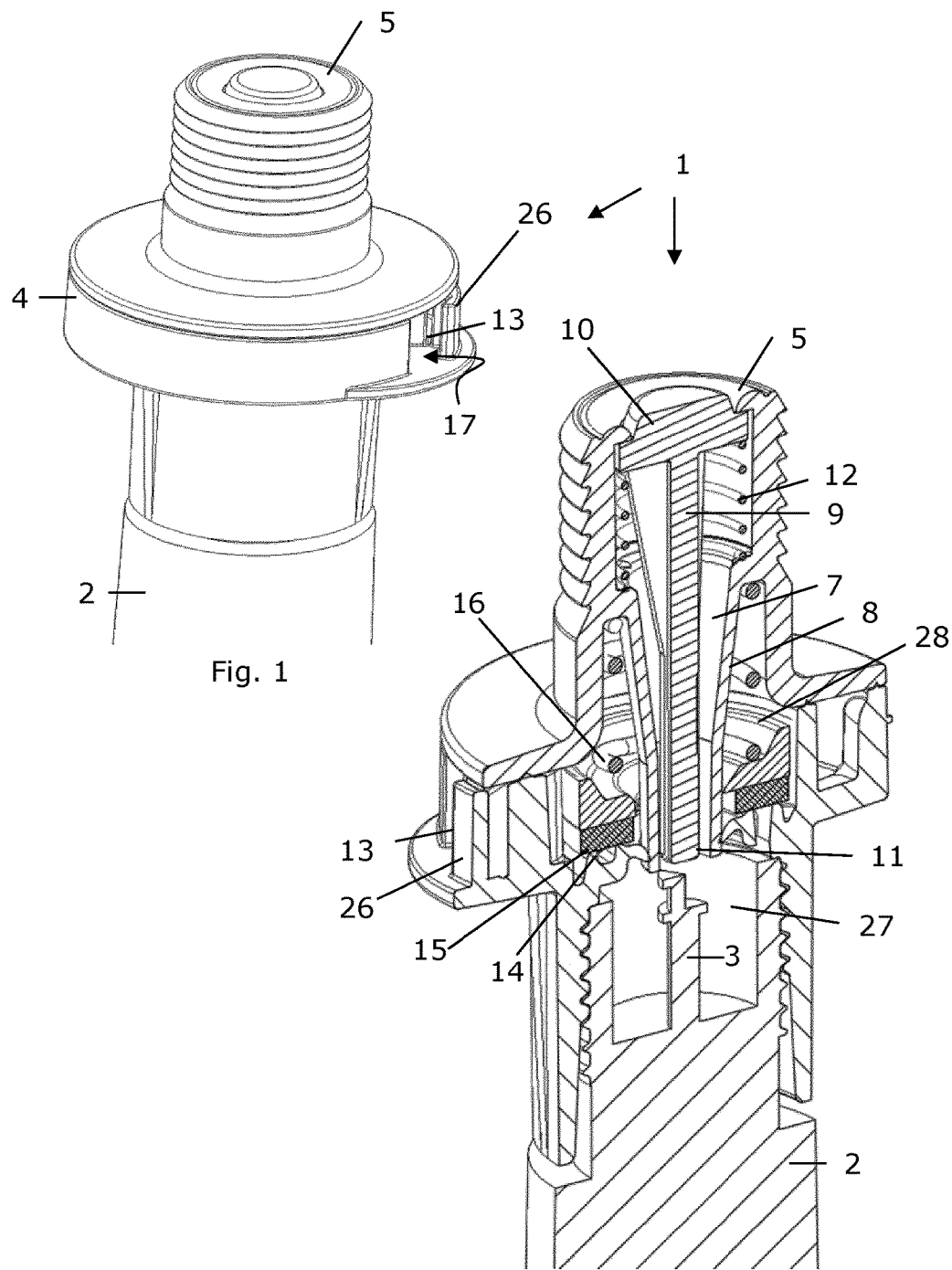
FIG. 1 illustrates in a perspective view, a filling device according to the invention.
FIG. 2 illustrates the filling device from FIG. 1 in cross-section.

FIGS. 1 and 2 illustrate a filling device 1 which is made specifically for filling a pneumatic tire. The illustrated device is made particularly for an American valve, also called a Schrader valve 2. The Schrader valve consists of a valve stem 3 with a spring (not illustrated). Schrader valves are used on automobile tires, bicycle tires, in air conditioning systems, plumbing, fuel injection engines, suspension systems, SCUBA regulators, and in many other inflatable items.

The Schrader valve allows removal and attachment of the inflation hose while in use. When the inflatable item is being inflated, the stem is depressed and the air passage is opened. Otherwise, the stem is pressed upwards and seals the passage.

The filling device 1 comprises a body 4 which has an inlet 5. The inlet is connectable to a compressor via a threaded connection. At its axially opposite end, the filling device forms an outlet 6 (c.f. FIGS. 3 and 4) which has an internal threading for connection to an external threading on the Schrader valve.

A main passage 7 extends axially within the inner conduit wall 8 and connects the inlet and the outlet. A filling device stem 9 with a flat head 10 and an elongated body towards a tip 11 is movable in the main passage. The filling device stem is arranged such that the tip is adjacent the valve stem when the filling device is attached to the valve. In that way, the valve stem can be operated by use of the filling device stem when a compressor is attached to the inlet 4. The filling device stem is biased upwards by the first spring 12.

The filling device further comprises an air-release path extending from the main passage to a release outlet 13. The air-release path enables release of air from the passage into the surrounding external space.

The filling device further comprises an internal valve with a seat 14 and a valve element 15 movable relative to the seat to open and close for the air-release path and thereby to control the flow of air to the external space.

The valve is biased towards a closed configuration by the second spring 16 and it is configured to open at a predefined pressure, i.e. when the pressure provides an opening force exceeding the closing force provided by the second spring 16.

The filling device may particularly form a lower chamber 27 between the valve 2 of the inflatable item and the valve seat 14, and an upper chamber 28 above the valve seat 14. From the upper chamber, the air-release path extends towards the ambient space.

To provide a clear whistling sound, the filling device comprises a tone chamber 18 forming an extension of the air-release path. The tone chamber may extend about the main passage and about the aforementioned upper chamber, or about the main passage and about the aforementioned lower chamber.

The filling device comprises a whistle 17 arranged to produce an audible signal based on a flow of air in the air-release path. The whistle is more clearly seen in FIGS. 3 and 4. The whistle is constituted by the tone chamber 18 in combination with the lateral opening 19 and the forward edge 20 on the sidewall 21 of the tone chamber 18. When air escapes through the air-release path, the air passes a constriction 22 which reduces the cross section of the air-release path in the flow direction of air being released into the external space. The constriction increases the flow speed through the air-release path and focuses the air stream which leaves the constriction.

After the constriction 22, the air flows across the forward edge and thereby generates a whistling sound.

The tone chamber 18 has a circular shape and extends about the passage 7. This enables a relatively long tone chamber with a short axial length of the filling device.

FIG. 3 illustrates an exploded view of the filling device. The filling device comprises a lower basis member 23 forming the air-release path, the outlet 6, the seat 14, the lateral opening 19, and the tone chamber 18.

The upper basis member 24 forms a closure for the air-release path and forms an upper part of the main passage including an upper part of the inner conduit wall 7, and the inlet 5.

Additionally, the filling device comprises the filling device stem 9, the first spring 12, the second spring 16 and the valve element 15 movable in a space between the lower and upper basis members.

At the lateral opening 19, the air-release path is asymmetrically shaped and forms a widened-out section defined by the asymmetric wall section 26 immediately after the constriction 22. The widened-out section promotes the Coanda-effect and configures the whistle not to provide the audible whistling signal when the flow of air in the air-release path exceeds an upper flow limit. At the upper flow limit, the airflow will deflect radially outwards and away from the forward edge 20 thereby stopping whistling. When the flow speed is below the upper limit, it is insufficient to uphold the Coanda effect, and the radial outwards deflection of the airflow stops. The airflow thereby moves towards the forward edge 20 and the whistling sound starts.

Due to the increased airflow speed which is caused by the constriction 22, the effect becomes amplified and the limit between whistling and non-whistling becomes sharp—i.e. the whistling starts and stops precisely at a certain flow speed.

FIG. 4 illustrates that the air-release path forms an initial section 25 extending radially away from the main passage, the initial section being between the passage and the circumferential section in the flow direction of air being released into the external space through the air-release path.

Figure 5:
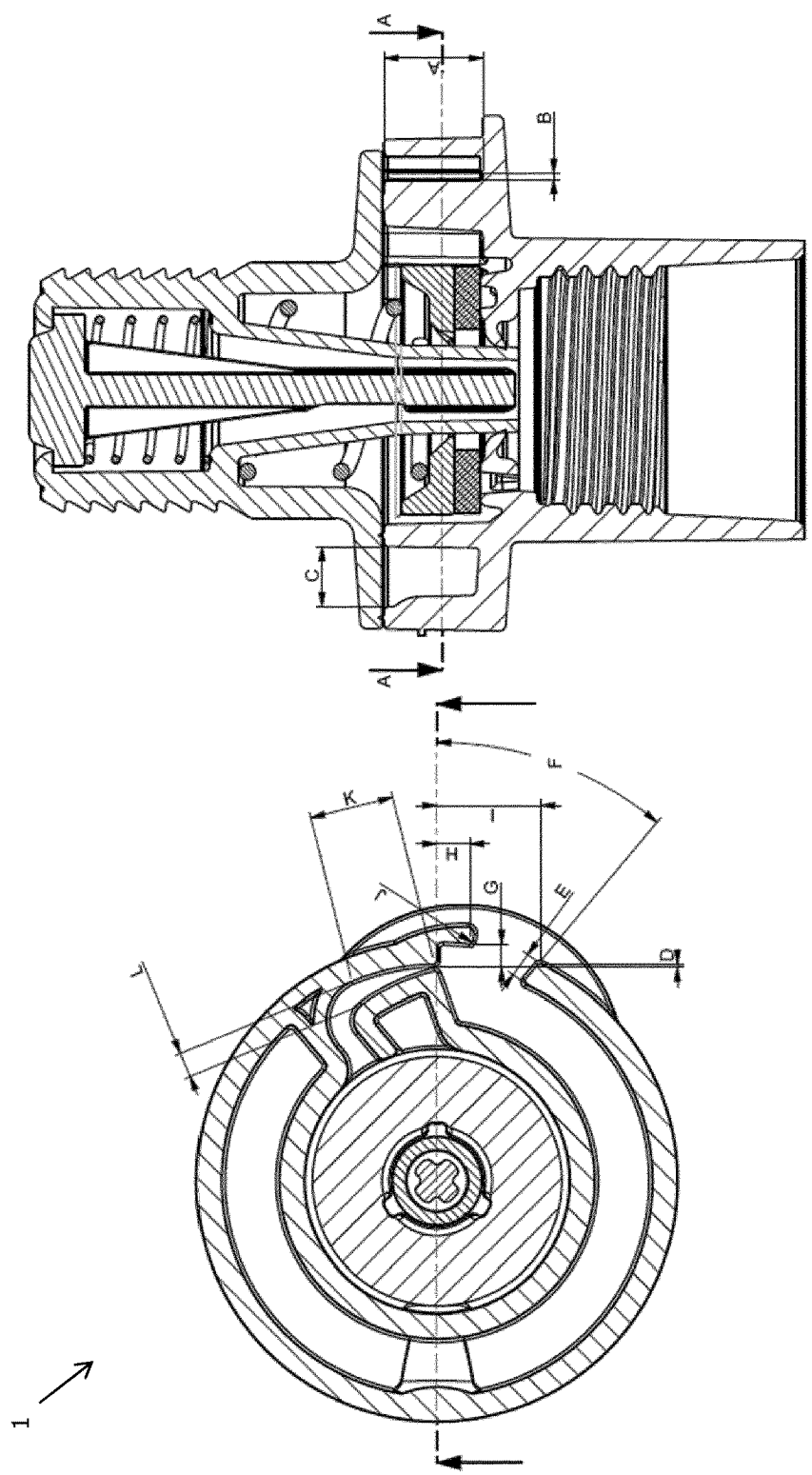
FIG. 5 illustrates details of the filling device of FIGS. 1-4, and
FIGS. 6-14 illustrate different alternative embodiments of a filling device.

FIG. 5 illustrates details of the filling device 1 of FIGS. 1-4. The letters A-M, cf. column 1 in Table 1 below, refers to the dimensions indicated in FIG. 5. These dimensions are particularly suitable for a filling device to be attached to a valve of a car or truck tire, typically a Schrader valve. The dimensions are preferably within maximum +/−20 percent of the indicated dimensions, more preferably within +/−10 percent.

Column 3 specifies technical effects of the filling device. It should be understood, that these effects are relative to a filling device suitable for inflating a tire for a car or a truck. The skilled person would understand that the invention is not limited to these dimensions and that other dimension would also fall within the scope of the invention.

different ways to achieve that the whistle 17 does not to provide an audible signal when the flow of air in the air-release path 13a exceeds an upper flow limit. For each of the different embodiments, an audible signal is present when a laminar air flow is present in the air release path 13a. When the Coanda effect occurs, the direction of the air flow is changed sufficiently to ensure that the audible signal is no longer provided.

The whistle 17 forms a tone-chamber 18 and a whistle mouth 17a. The air flows via the air-release path 13a to the release outlet 13 to release air towards the whistle mouth 17a. The flow diverting structure 29 is configured to change the direction of the flow of air after it has been released at the release outlet 13 by utilisation of the Coanda effect, whereby the flow diverting structure 29 establishes the change of the direction of the flow of air when reaching the upper flow limit. Consequently, the whistle 17 does not to provide the audible signal when the flow of air in the air-release path 13a exceeds the upper flow limit.

Figure 6:
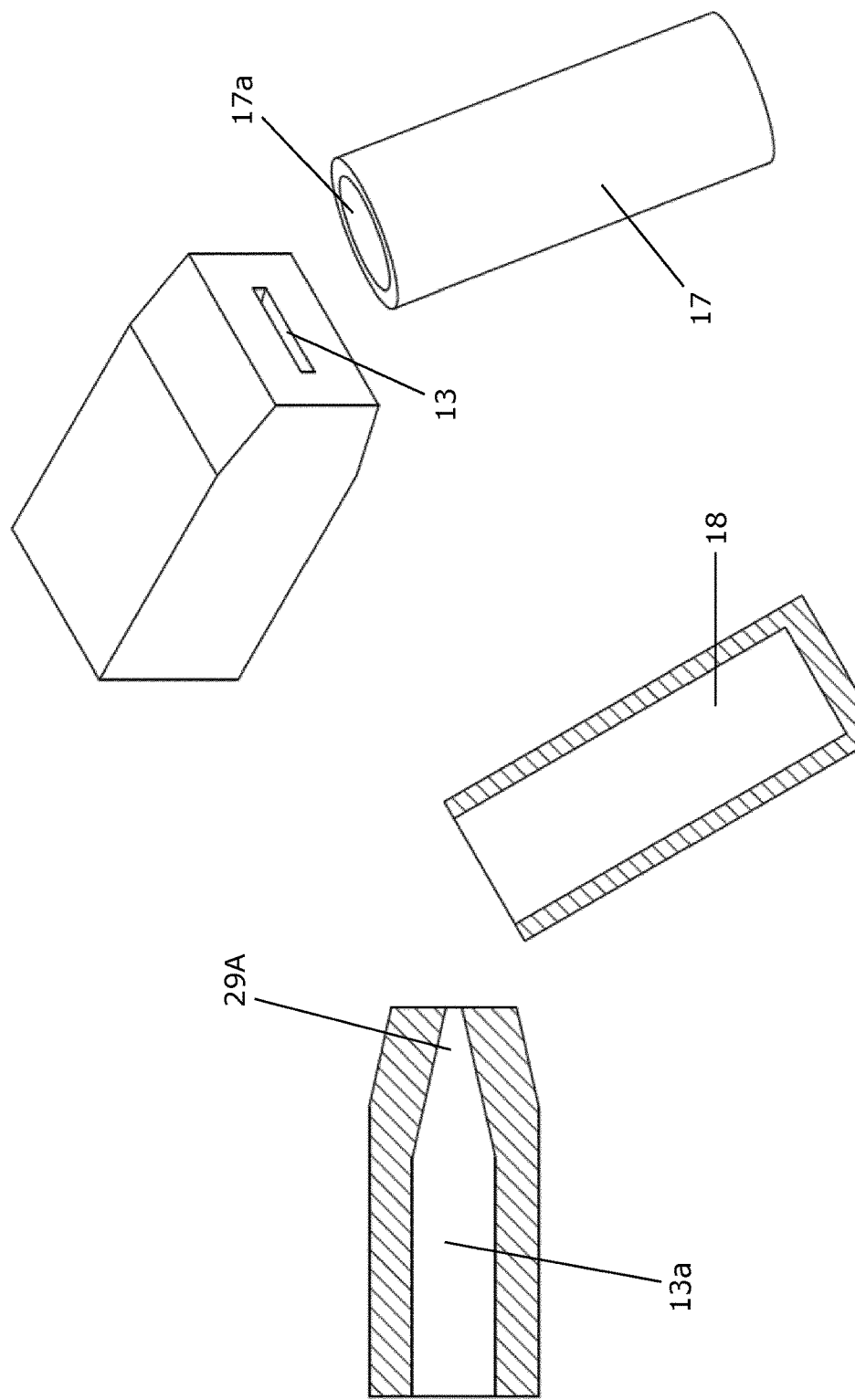
Figure 7:
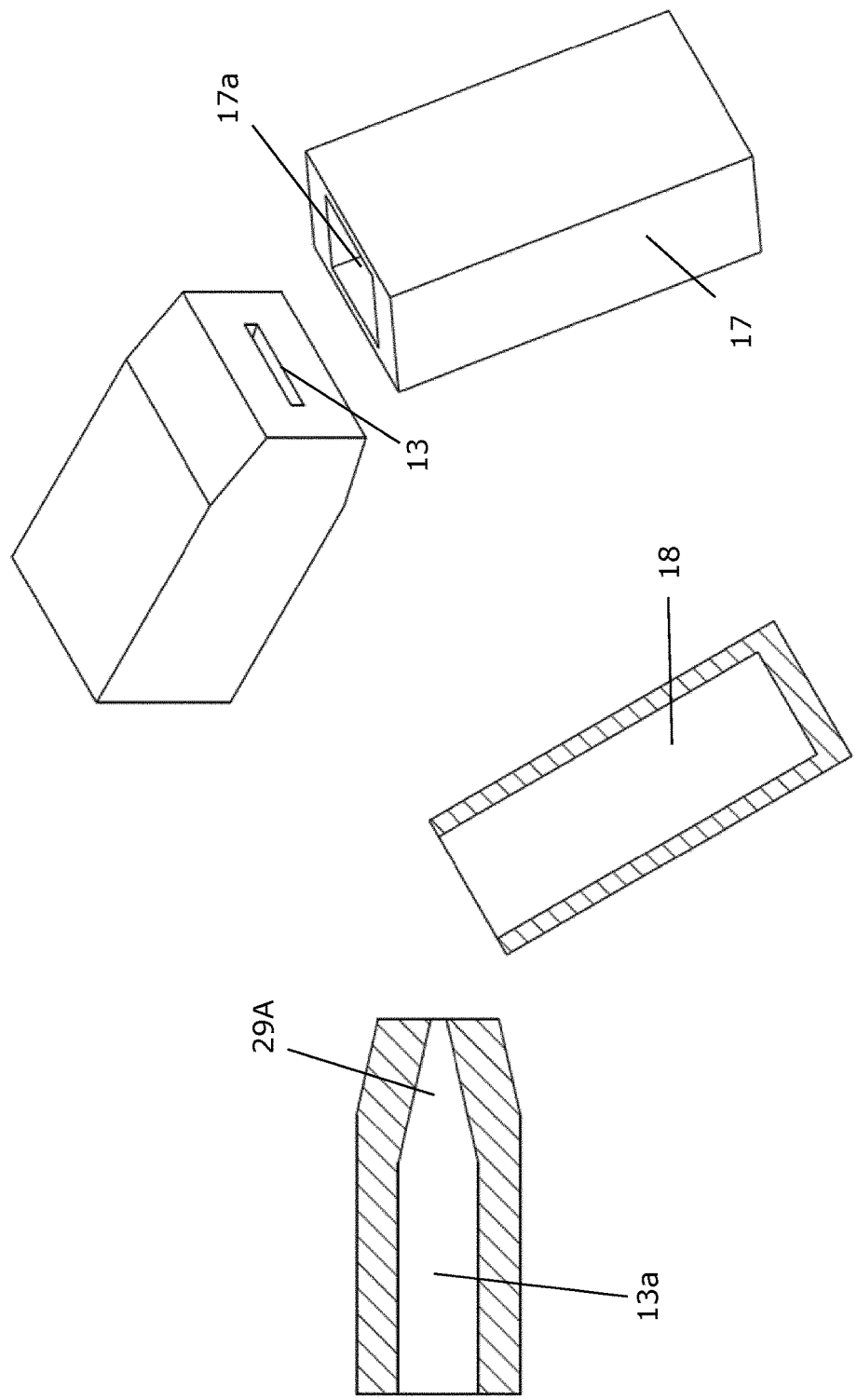

In FIGS. 6 and 7, the flow diverting structure 29A is formed as a symmetric narrowing of the air release path 13a, i.e. the release outlet 13 itself constitutes the flow diverting structure. In FIG. 6, the tone-chamber 18 has a circular cross-section, whereas the tone-chamber in FIG. 7 has a cross-section being square-shaped. In both embodiments, the release outlet 13 has a cross-section being square-shaped.

TABLE 1

| | | | |
|---|---|---|---|
| A | Nozzle slit length. Square resonance chamber profile height | Longer slit increases power of sound generation | 3.1 mm |
| B | Nozzle slit width | Chosen to have laminar flow in desired flow range | 0.2 mm |
| C | Resonance camber width | Chosen for stable resonance generation | |
| D | Tone edge alignment with nozzle flow direction | Distance from perfect alignment defines at which flow the tone generation begins, the higher value the lower flow for onset | 0.1 mm |
| E | Tone edge wall thickness | May not be too large - other the tone generation would be inhibited | 0.8 mm |
| F | Angle of attack between nozzle flow direction and tone edge | Defines at which flow the tone generation begins, the greater angle the lower flow for onset | 40° |
| G | Distance from nozzle flow path to Coanda wall fillet transverse to flow | Defines at which flow rates the flow is diverted | 0.7 mm |
| H | Length of Coanda wall along nozzle flow | Defines at which flow rates the flow is diverted | 1 mm |
| I | Distance from nozzle to tone-edge along flow direction | Keep long enough to allow diverted flow to pass clear of tone edge and low to prevent wind to disturb the normal flow path | 3.3 mm |
| J | Coanda wall fillet at flow intervention | Secures the diverted adhere to wall. Size also determines the flow rate at which the stream is diverted | 0.1 mm |
| K | Length of flow acceleration path | Secures laminar flow in the desired flow range. Shorter will cause turbulent at lower flow rates | 2.7 mm |
| L | Start width of flow acceleration path | Secures laminar flow in the desired flow range. Wider will cause turbulent at lower flow rates | 0.8 mm |
| M | Resonance camber length | Length defines frequency of tone. The longer the lower pitch of tone. Too short makes high pitch unpleasant sound | 30 mm and 2.500 Hz |
| K/(L − B) | Rate of acceleration | Low ratios cause turbulence, which inhibits tone generation. | 4.5 |
| A * B | Nozzle area | Defines general flow rate versus pressure drop | 0.62 mm^2 |
| A/C | Squareness of resonance chamber profile | The closer to 1, the more true square, which improves stability of tone generation and reduces the powers of the harmonics | 1.6 |
| H, G and J | | In correlation defining at which flow rates the flow is diverted | |
| H/I | Relative distance for diverted flow to pass clear of tone edge | | 3.3 |

Figure 8:
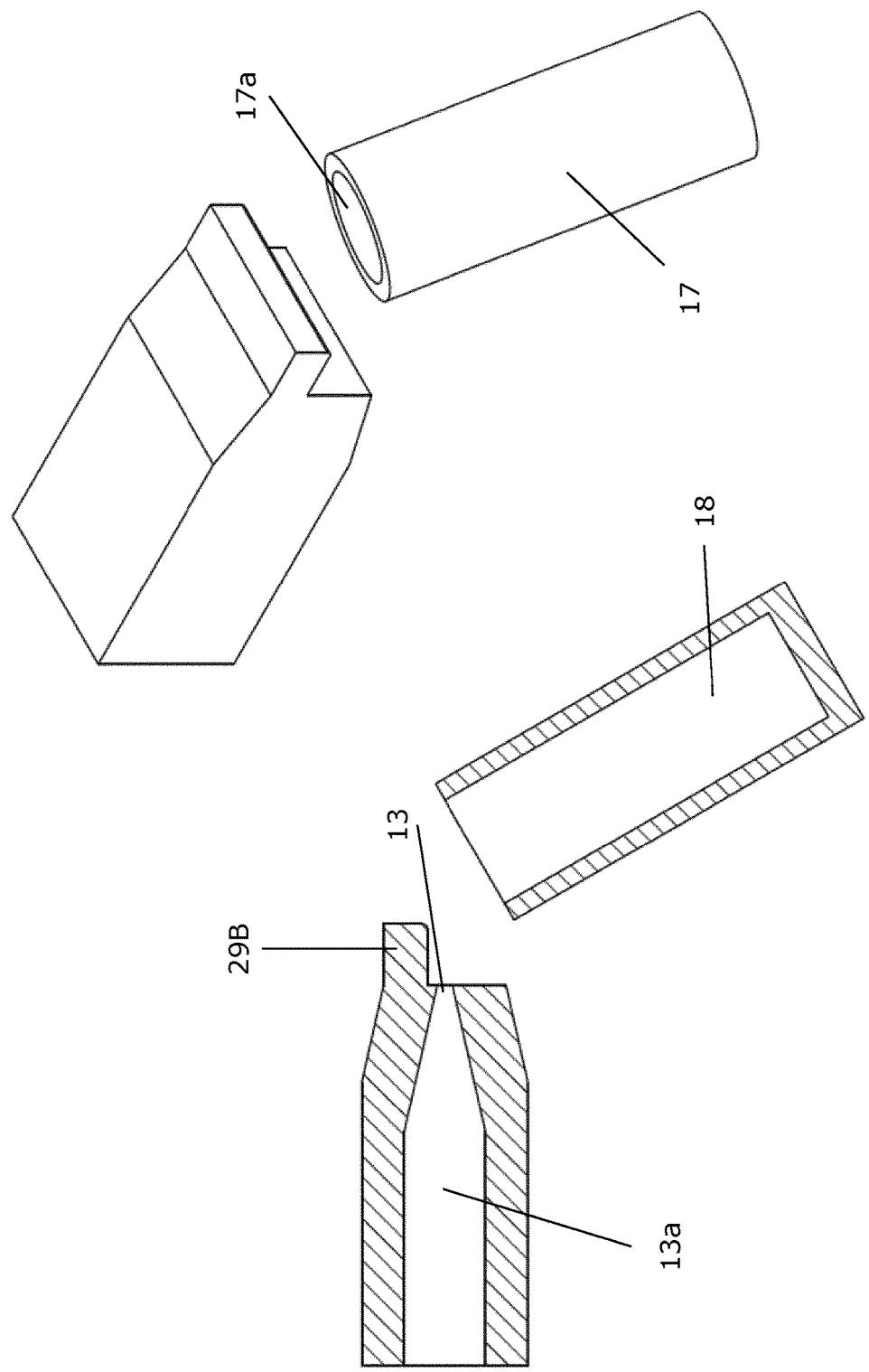

FIGS. 6-13 illustrate different alternative embodiments of a filling device 1, where the Coanda effect is triggered in In the embodiment illustrated in FIG. 8, the flow diverting structure 29B is formed as an asymmetric wall section at the release outlet 13. The tone-chamber 17 is similar to the tone-chamber illustrated in FIG. 6.

Figure 9:
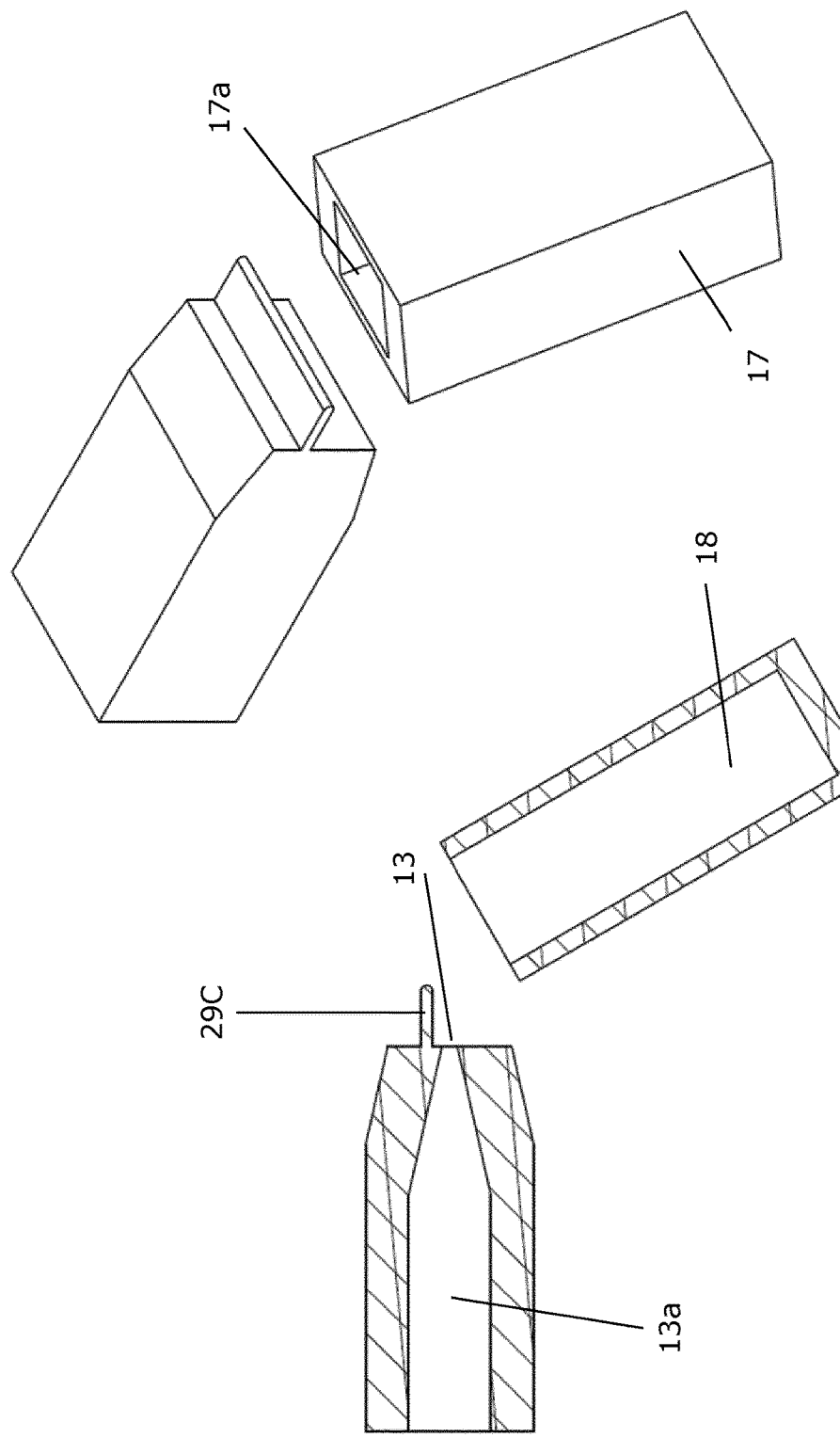
Figure 10:
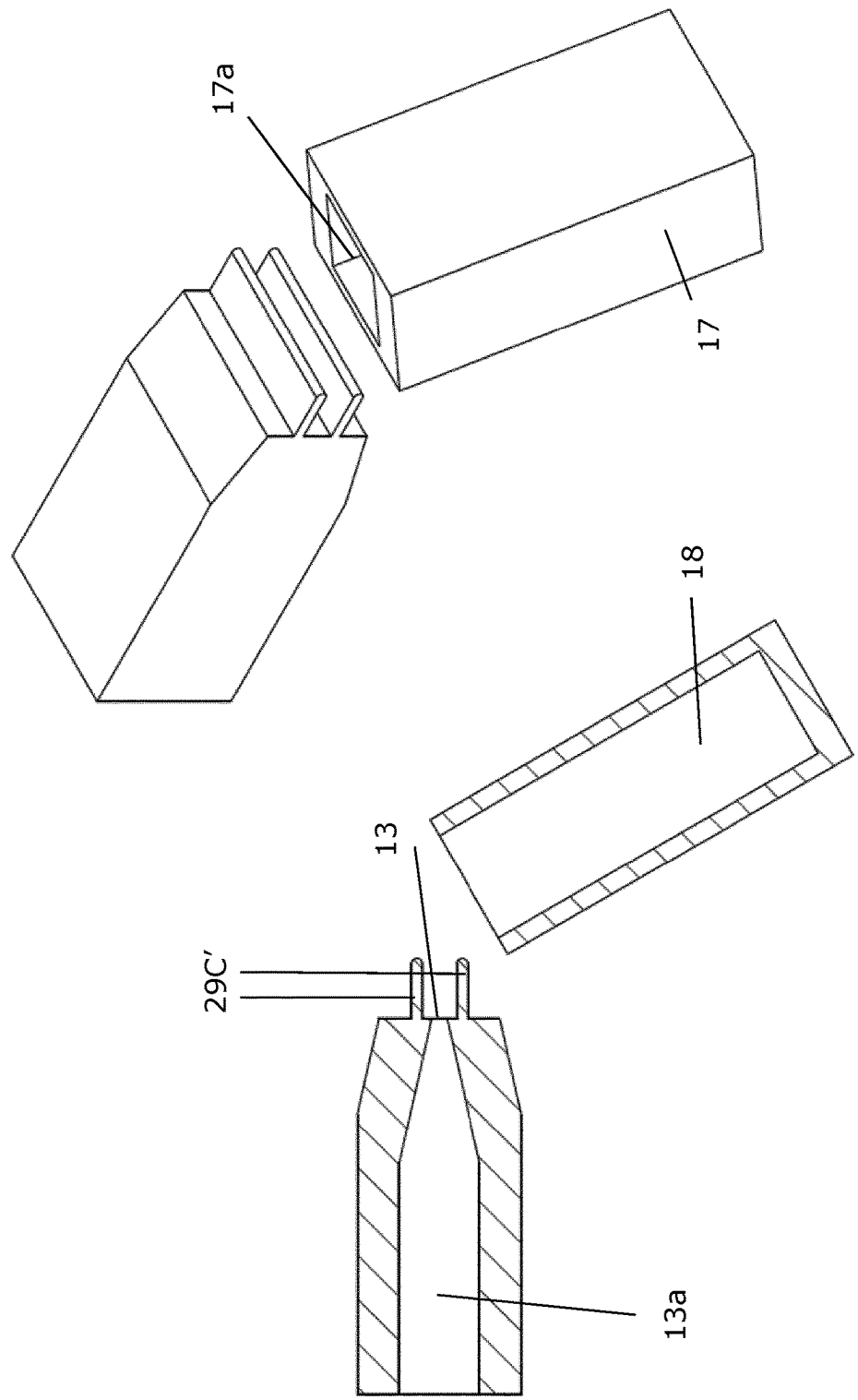

In FIG. 9, the flow diverting structure 29 is formed as a resilient wall section 29C, whereas the embodiment of a filling device illustrated in FIG. 10 comprises two resilient wall sections 29C' on opposite sides of the release outlet 13. The symmetric resilient wall sections 29C' will cause the air flow to change direction towards one of the two sections 29C'. In both embodiments, the tone-chamber 17 is similar to the tone-chamber illustrated in FIG. 7.

Figure 11:
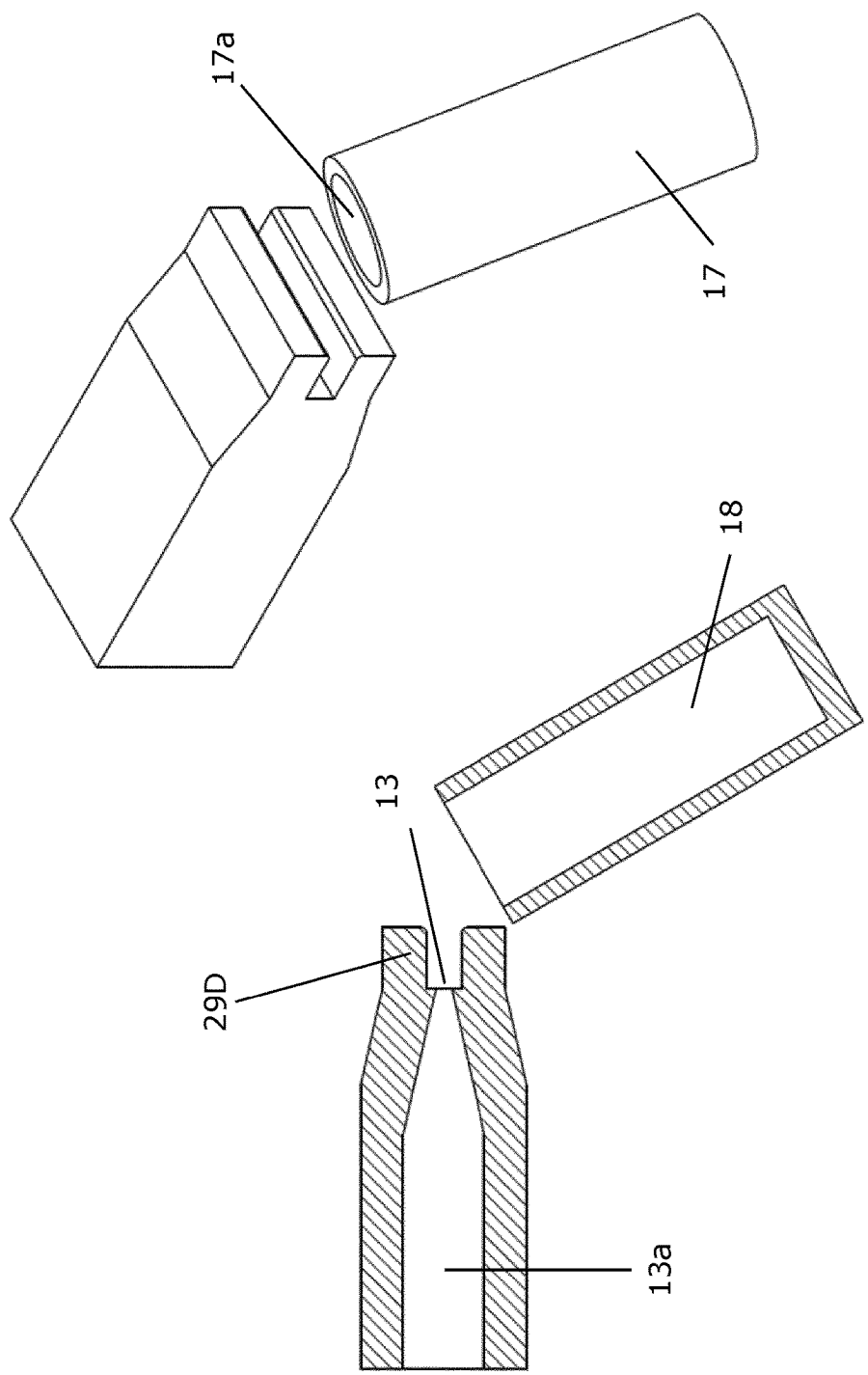

In the embodiment illustrated in FIG. 11, the flow diverting structure 29D is formed as two wall sections arranged on opposite sides of the release outlet 13. The symmetric wall sections 29D will cause the air flow to change direction towards one of the two sections 29D. The tone-chamber 17 is similar to the tone-chamber illustrated in FIGS. 6 and 8.

Figure 12:
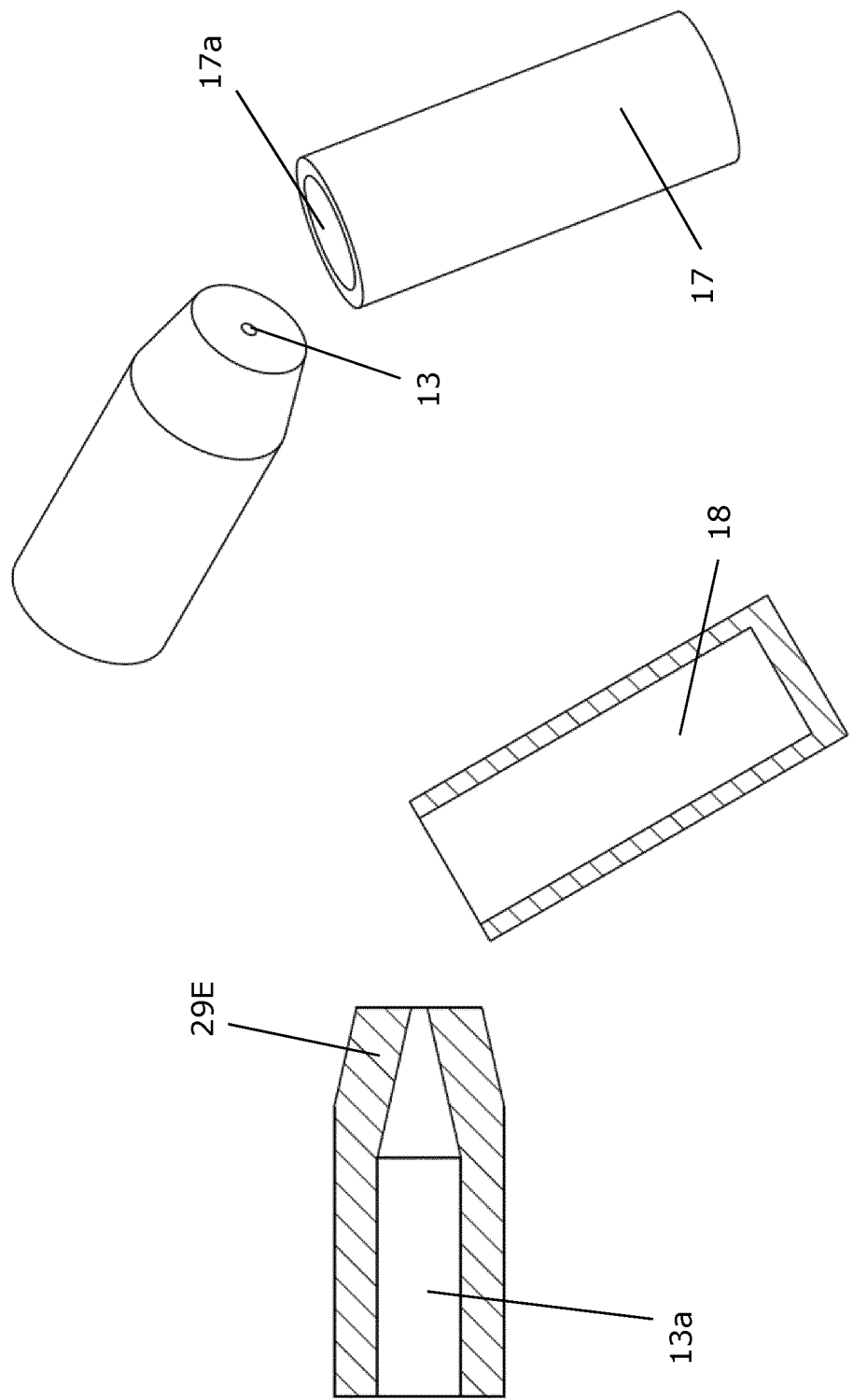
Figure 13:
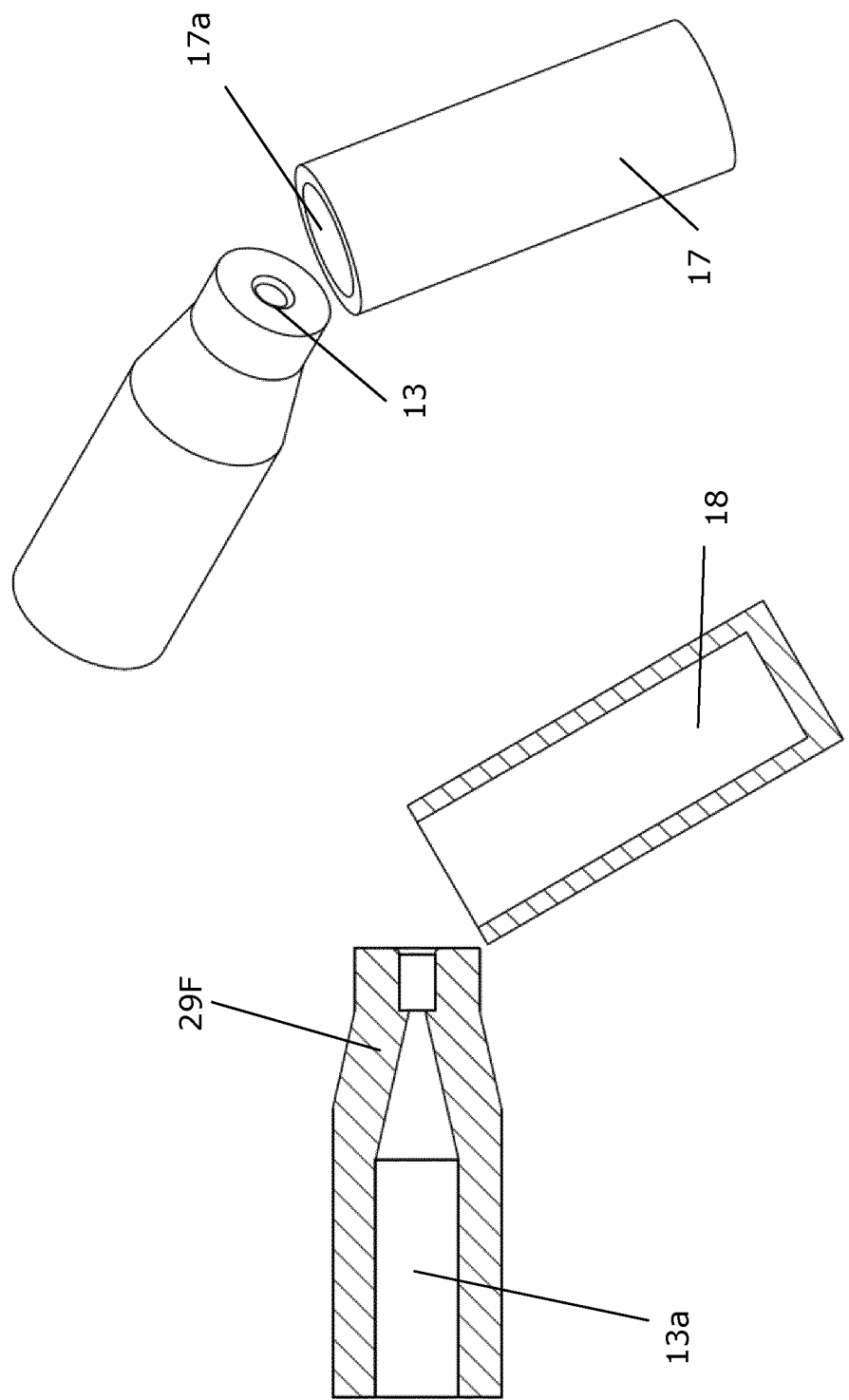

FIGS. 12 and 13 illustrate two different embodiments of a filling device comprising a rotational symmetric flow diverting structure 29E, 29F. In FIG. 12, the flow diverting structure 29E is narrowing down towards the release outlet 13 along its full length, whereas the flow diverting structure 29F illustrated in FIG. 13 comprises a section having a cross-section narrowing down followed by a section having a cross-section being uniform. The flow diverting structure 29F illustrated in FIG. 13, will change the air flow from a concentrated jet to a soft diffuse vane at higher air flows.

Figure 14:
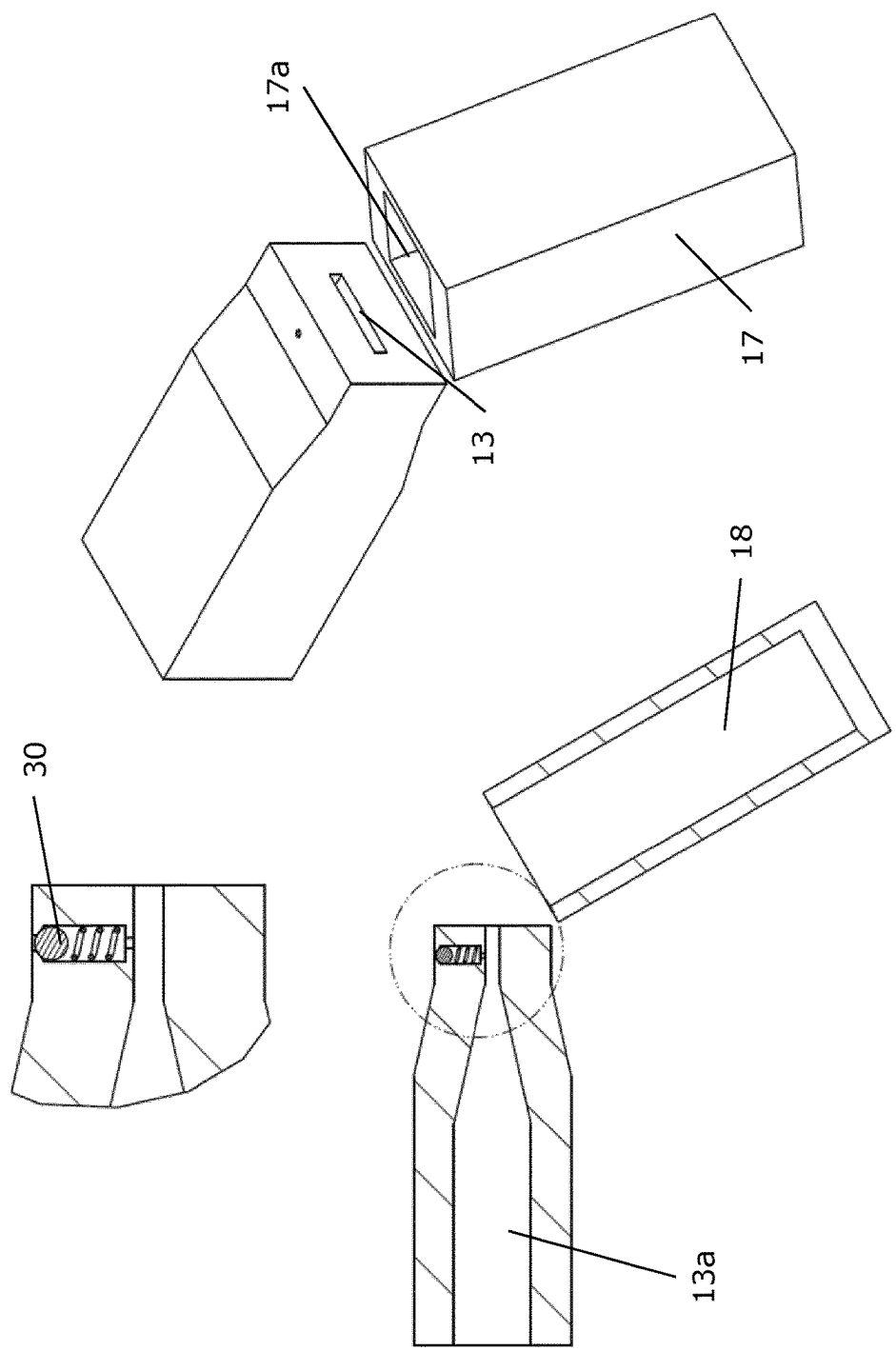

FIG. 14 illustrates a further alternative embodiment of a filling device 1. The filling device 1 comprises a flow disturbing structure 30 in the form of a bleed opening 30 in the air release path 13a in the vicinity of the release outlet 13. The flow disturbing structure 30 causes a change of the flow of air from a laminar flow to a turbulent flow after it has been released at the release outlet, whereby the whistle 17 does not to provide the audible signal when the flow of air in the air-release path 13a exceeds the upper flow limit.

The invention claimed is:

1. A filling device for an inflatable unit, the device comprising a body having an inlet connectable to a source of pressure, and an outlet connectable to a valve for the inflatable unit, a passage extending axially between the inlet and the outlet; an air-release path from the passage to a release outlet for releasing air in the passage into an external space; a valve arranged between the passage and the air-release path and being configured to open at a predefined pressure; and a whistle arranged to produce an audible signal based on a flow of air in the air-release path; wherein the whistle is configured not to provide the audible signal when the flow of air in the air-release path exceeds an upper flow limit.

2. The filling device according to claim 1, wherein the whistle forms a tone-chamber, and wherein the filling device further comprises a flow diverting structure arranged between the release outlet and the tone-chamber, the flow diverting structure being configured to change the direction of the flow of air after it has been released at the release outlet, the flow diverting structure being configured to establish the change of the direction of the air flow when the flow of air reaches the upper flow limit.

3. The device according to claim 2, wherein the configuration of the whistle not to provide the audible signal when the flow of air in the air-release path exceeds the upper flow limit is provided by an asymmetric airflow at the release outlet, the asymmetric airflow being created by the flow diverting structure.

4. The device according to claim 3, wherein the asymmetric airflow is defined by the Coanda effect associated with said flow diverting structure.

5. The device according to claim 2, wherein the flow diverting structure forms an asymmetric wall section at the release outlet.

6. The device according to claim 2, wherein the flow diverting structure forms a symmetric wall section at the release outlet.

7. The device according to claim 2, wherein the flow diverting structure forms a resilient wall section.

8. The device according to claim 2, wherein the flow diverting structure forms a bleed opening in the passage in the vicinity of the release outlet.

9. The device according to claim 1, wherein the whistle is configured not to provide the audible signal when the flow of air in the air-release path is below a lower flow limit.

10. The device according to claim 1, wherein the air-release path has a cross-sectional area which reduces in the flow direction of air being released into the external space through the air-release path.

11. The device according to claim 1, wherein the air-release path comprises a circumferential section extending about the passage.

12. The filling device according to claim 1, wherein the air-release path forms an initial section extending radially away from the passage, the initial section being between the passage and a circumferential section in the flow direction of air being released into the external space through the air-release path.

13. The filling device according to claim 11 or 12, wherein the circumferential section is between the initial section and the release outlet in the flow direction of air being released into the external space through the air-release path.

14. The device according to claim 2, wherein the tone-chamber extends around the passage.

15. The device according to claim 2, forming a lower chamber between the valve and the release outlet, and where the tone-chamber extends around the lower chamber.

16. The device according to claim 14 or 15, wherein the tone chamber forms an extension of the air-release path.

17. The device according to claim 14, where the release outlet is between the air-release path and the tone chamber.

18. The device according to claim 1 and forming part of or being configured for connection to a Schrader valve.

19. A method of filling an inflatable unit by use of a filling device capable of releasing air to an external space at a predetermined air pressure and to produce an audible signal as a consequence of the release of air, the method comprising repeating the steps of:

filling air into the inflatable unit via the filling device; and
stopping the filling while listening for the audible signal;
until the audible signal begins when the filling is stopped.

20. A method according to claim 19, carried out by use of a filling device according to claim 1.

* * * * *